Oct. 30, 1962     C. M. RICE     3,060,890
CONE MARKER
Filed April 27, 1960
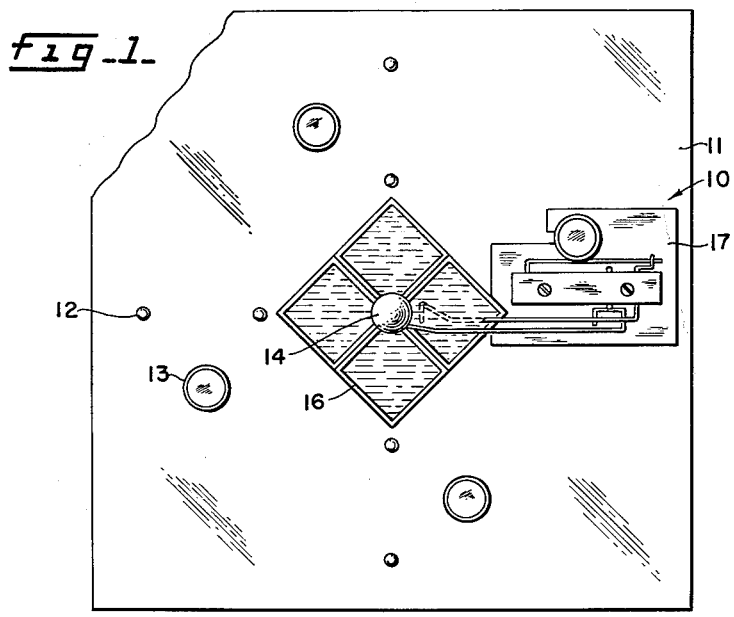
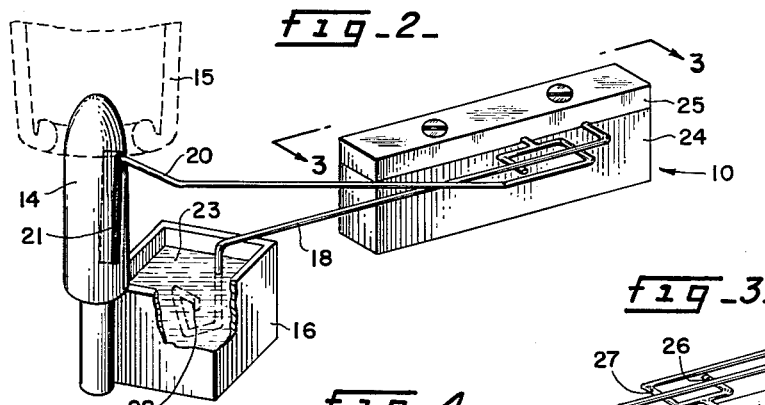
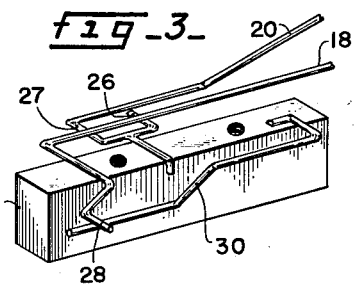
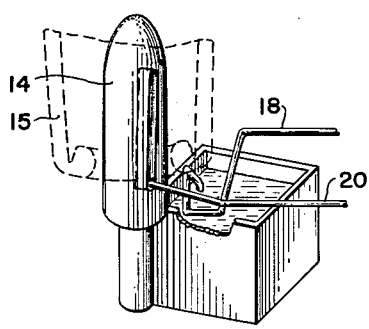
*INVENTOR.*
CHARLES M. RICE
BY *Francis W. Young*
ATTORNEY

United States Patent Office 3,060,890
Patented Oct. 30, 1962

3,060,890
CONE MARKER
Charles M. Rice, Candler, N.C., assignor to American Enka Corporation, Enka, N.C., a corporation of Delaware
Filed Apr. 27, 1960, Ser. No. 25,022
5 Claims. (Cl. 118—243)

This invention relates in general to a marking apparatus and more particularly to an article-actuated device for marking cones in order to identify yarn or other material contained thereon.

The present invention will be described in connection with the package coding of artificial or synthetic yarn, i.e. rayon and/or nylon, although the same obviously is useful in many other applications.

In view of the large variety of yarns sold commercially and the similarity in appearance thereof, it is imperative, for inventory and end use purposes, that the purchaser have a suitable system for determining at a glance the denier, number of filaments, type, etc., of yarn which he has available. Accordingly, the yarn manufacturer usually marks the tips or ends of cones with a color code. Cone will be used herein to describe or identify all types of yarn packages, such as bobbins, pirns, tubes, cops, etc.

Although stripes of various colors may be used to identify the particular yarn supplied on that cone, a system that has been found to function satisfactorily embodies a color dot code. The particular size, color, or number of dots painted on the cone tip is not within the scope of this invention, per se, and will not be described in detail, although the apparatus to be described hereinbelow accommodates variations in the coding system. Suffice it to say that in order for a color code to be sufficiently comprehensive to identifying with particularity all the various yarns available, one or more color dots, of the same or different color combinations, and dispersed in a specific manner about the cone periphery, must be provided.

In the past, these color coded dots have been applied onto the cone tip in a somewhat time-consuming and laborious operation. In one method, for example, all of the cones to be coded are aligned on a table with the tips facing upwardly. The operator then manually paints the dots, in the proper positions, and with the proper colors on each of the cone tips, usually with the aid of a small paint brush. Preferably, the dots of one color are applied to a number of cone tips by a long stroke with the brush. A separate operation of course is required for each color.

Moreover, it is extremely difficult for an operator, skilled or not, to mark successive cones in an identical manner when using the known paint-brush system. Usually there are variations in dot sizes as well as in relative location between dots on an individual cone. Additionally, the number of cones which can be prepared in a given time is limited and dependent purely on the personal skill and dexterity of each operator.

An object of this invention is to provide a cone marking or painting apparatus not having the disadvantages mentioned above.

Another object of the present invention is to provide an apparatus for making or coding yarn supporting packages to identify the particular yarn contained thereon which requires very little skill for operation.

An additional object of this invention is to provide a cone marking apparatus which is extremely flexible in application and which may be readily adjusted to vary the coded mark applied thereby.

Still another object of the present invention is to provide a color coding apparatus which will apply uniform marks on successive cone tips and which requires a minimum of maintenance.

Another object of this invention is to provide a cone marking apparatus capable of simultaneously applying a plurality of code marks of similar or different shape or color.

A more specific object of this invention is to provide an article-actuated apparatus for applying paint or lacquer marks to cone tips which may be operated for long periods of time without maintenance of the marking tip due to hardening the marking material.

These objects may be accomplished, in accordance with the present invention, by disposing one or more marking devices about a common guide, each marking device having a marking tip aligned with the area to receive the code, and by providing an actuating lever in the path of the article so that engagement with and movement of the actuating lever by the article will shift the marking tip from an inoperative position to one in engagement with the article. A container should be placed adjacent the marking device and should be filled with a marking liquid to a sufficient level that the marking tip in inoperative position will be completely submerged therein.

Other objects and advantages of this invention will become apparent upon study of the following detailed disclosure taken in conjunction with the accompanying drawings, wherein FIGURE 1 is a top plan view of a marking device equipped to apply a single coded mark to each article, but showing mounting brackets for three additional markers;

FIGURE 2 is a perspective view of the marker shown in FIGURE 1, in inoperative or non-marking position;

FIGURE 3 is a perspective view of a portion of FIGURE 2, taken along the line 3—3 of that FIGURE, and showing the operating mechanism of the marking device; and FIGURE 4 is a perspective view of the marker illustrated in FIGURE 2, but in operative or marking position.

Turning now to the drawings, it is pointed out that although only one marking device 10 is shown, other identical devices may be added as necessary. The supporting base 11 shown only in FIGURE 1 is equipped to receive a total of four such markers 10, there being provided four sets of guide pins 12 and clamping screws 13.

If more than one marking device 10 is desired or required, the same would be disposed, preferably in a symmetrical manner, about guidepost 14, which is mounted centrally with respect to the base, as shown. The guide or guidepost 14 is tapered to expedite insertion thereover of a cone 15, shown only in dotted lines. The lower edge of cone 15 is exposed after yarn is collected thereon, and therefore provides an excellent surface area for receiving a color code.

A separate marking-liquid container 16 is provided for each of the marking devices 10. These containers are also disposed symmetrically about guidepost 14, as shown. If only one marking device is to be used, i.e., if only one color dot is applied to the cone tip, then the additional containers of course need not be filled with marking material.

It should be understood that arrangements other than that shown in FIGURE 1 may be required. For example, disposing the containers and clamping screws circumferentially about guide 14 at 60° intervals would accommodate simultaneous application of up to six different color dots.

For the specific mechanism required to operate each individual device, attention is directed to FIGURES 2, 3, and 4, with only occasional reference to FIGURE 1. Note that slotted foot 17 of the marking device, which cooperates with clamping screw 13 and pins 12, has been omitted from the detail figures for purposes of clarity.

Each marking device 10 is provided with a marking arm 18 and an actuating lever 20 The free end of actuating lever 20 engages within a vertically extending longitudinal slot 21 formed in guidepost 14. It will be apparent that although only one slot 21 is shown one will be provided for each of the marking devices which might be used. The upper end of slot 21 forms a limit for movement of lever 20 in inoperative position while the lower end of each slot limits movement in an operative direction. The lower end also serves to limit downward movement of cone 15 about guidepost 14, and indirectly controls upper movement of marking arm 18 toward the cone.

The outer or free end of marking arm 18 is curved in the manner shown to overlie container 16 and terminates in a marking tip 22. It will be observed from the drawing that the marking tip is completely submerged in marking liquid 23 when not in operation. The purpose of this, as explained above, is to prevent hardening of paint or lacquer on the tip when inactivated for long periods of time. Accordingly, the tip 22 will paint successive dot sizes almost without regard to the period of non-use.

Both the marking arm 18 and the actuating lever 20 are pivotally supported from base plate 24 and cover plate 25. For ease of construction, these plates have been fabricated separately and secured together, although it is obvious that a unitary pivotal mount could be provided. The pivoted end of actuating lever 20 is formed into front and rear legs 26, 27, respectively, with the pivotal axis located substantially centrally therebetween, as shown more clearly in FIGURE 3. These legs support marking arm 18 near the pivotal end thereof and, together with slot 21 in guidepost 14, limit both upward and downward movement of the arm. Upon movement of lever 20 in a downward direction by cone 15, rear leg 27 operates as a cam to pivot marking arm 18 upwardly. Because of the short distance of leg 27 from the pivotal axis of arm 18, it will be seen that marking tip 22 will engage the cone with a sharp blow to insure a clear impression of paint on the surface thereof. Downward movement of arm 18 is limited by equal pressure of both legs 26, 27.

The marking arm is also provided with a cam surface 28 in the form of a depending leg. The cam surface engages with the unsupported end of elongated spring 30, as shown, and these two elements serve to return the marking device to inoperative position upon completion of a marking operation, or upon removal of cone 15 from the guidepost. This mounting also permits complete retraction of the marking arm for cleaning purposes, when such is required.

Operation of the marking device should be apparent from a study of the foregoing disclosure, but will be described briefly hereinbelow. The operator first selects the desired color of marking liquid 23, as well as the required number of marking devices 10 to be used. The containers should be substantially filled with liquid 23, or filled to a sufficient depth that the marking tip 22 will be submerged in inoperative position. This not only provides for uniform application of coloring material, but also prevents hardening or coagulation of the marking material on the tip, as explained supra.

With the marking apparatus conditioned for operation in the manner described, the operator has only to press cones 15 downwardly onto guidepost 14 until further movement is prevented, as when the free end of lever 20 strikes the lower end of slot 21. The motion thus produced in lever 20 will, by means of the linkage already described, cause the marking tip 18 to rise into contact with cone 15, depositing a dot of paint thereon. This operation may be repeated as fast as the cones can be handled, and for a considerable period of time without refilling containers 16 because of the small amount of marking liquid used per application. Upon completion, marking arms 18 may be pivoted out of the containers and cleaned merely by wiping with a cloth or paper. The containers may be stored for future use, or emptied and cleaned as required.

The particular configuration of marking tip 18 is relatively unimportant insofar as concerns this invention. Although a short bar has been shown, the same could terminate in a round surface, small or large, depending upon the code to be used. The construction shown, however, is simple to manufacture and operates quite satisfactorily to apply uniformly sized dots on the cone. The cone 15 shown herein for purposes of illustration is apertured, as indicated in dotted lines, and during a marking operation is radially aligned with respect to the marking tips by the guidepost 14. Other guide means, of course, could be used for accommodating differently shaped articles. Additionally, although paint or lacquer is generally used for the marking liquid, it is contemplated that inks or other materials could be provided if required or desired.

Inasmuch as modifications other than those mentioned above will become apparent to those skilled in this art, it is intended that the scope of the present invention be limited only to the extent set forth in the following claims.

What is claimed is:

1. A marking device comprising a base, a guidepost supported from said base and provided with a longitudinal slot in the surface thereof, a container substantially filled with marking liquid supported by said base adjacent said guidepost, an actuating lever pivotally supported by said base and having a free end slidably engaging the slot formed in said guidepost, said actuating lever having a cam surface adapted to be pivoted upwardly in response to downward movement of the free end thereof, a marking arm also pivotally supported by said base, said marking arm overlying the cam surface of said actuating lever and being movable upwardly in response to downward movement of said lever, and a marking tip supported by one end of said marking arm, said marking tip being movable from an inoperative position beneath the surface of marking liquid to an operative position above said surface of liquid and adjacent said guidepost.

2. A cone marking device as set forth in claim 1 and further comprising resilient means for urging said marking arm toward inoperative position.

3. A cone marking device as set forth in claim 2 and further comprising means on said actuating lever for limiting movement of said marking arm toward inoperative position.

4. An article actuated cone marking apparatus comprising a supporting base, a guide mounted on said supporting base, at least one container supported by said base adjacent to said guide, said container being substantially filled with marking liquid, at least one marking device removably supported by said base, each marking device including an actuating lever pivotally supported at one end and provided with a free end extending beside said guide, an elongated marking arm pivotally supported from one end and having a free end extending over said container adjacent said guide, and a marking tip supported by the free end of said marking arm, said marking arm overlying said actuating lever and being pivoted thereby from an inoperative position wherein said marking tip is submerged in said marking liquid to an operative position wherein said marking tip extends above said marking liquid adjacent said guide, whereby downward movement of a cone over said guide will operate said actuating lever to pivot said marking arm from inoperative to operative position to effect engagement of said marking tip with a surface of the cone.

5. An article actuated cone marking apparatus as set forth in claim 4 wherein a plurality of containers and a corresponding number of marking devices are circumferentially disposed about said guide for simultaneous operation when a cone is pressed thereover.

References Cited in the file of this patent
UNITED STATES PATENTS
2,246,094    Glazebrook et al. _____ June 17, 1941